(12) United States Patent
Takahashi

(10) Patent No.: US 6,415,301 B1
(45) Date of Patent: *Jul. 2, 2002

(54) INTEGRATED RETRIEVAL SYSTEM, INTEGRATED RETRIEVAL METHOD AND MEDIA RECORDED WITH INTEGRATED RETRIEVAL PROGRAM IN DISTRIBUTED FILE SYSTEM

(75) Inventor: Eiji Takahashi, Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/050,419

(22) Filed: Mar. 31, 1998

(30) Foreign Application Priority Data

Nov. 13, 1997 (JP) .............................. 9-311879

(51) Int. Cl.$^7$ ............................................... G06F 17/00
(52) U.S. Cl. ........................ 707/205; 707/200; 707/102
(58) Field of Search ............. 707/1–206; 711/200–202, 711/109–110; 712/233–241, 225

(56) References Cited

U.S. PATENT DOCUMENTS

| 4,325,120 | A | * | 4/1982 | Colley et al. ................ 364/200 |
| 5,526,416 | A | * | 6/1996 | Dezonno et al. ............. 379/265 |
| 5,606,657 | A | * | 2/1997 | Dennison et al. ............ 395/501 |
| 5,832,511 | A | * | 11/1998 | Beck et al. .................. 707/201 |
| 5,978,577 | A | * | 11/1999 | Rierden et al. .............. 707/100 |

* cited by examiner

Primary Examiner—David Jung
(74) Attorney, Agent, or Firm—Staas & Halsey LLP

(57) ABSTRACT

An integrated retrieval system, an integrated retrieval method and a medium recorded with integrated retrieval programin a distributed file system, wherein data retrieval efficiency is improved by integrating existing file systems using an agent.

10 Claims, 7 Drawing Sheets

INTEGRATED RETRIEVAL SYSTEM, INTEGRATED RETRIEVAL METHOD AND MEDIA RECORDED WITH INTEGRATED RETRIEVAL PROGRAM IN DISTRIBUTED FILE SYSTEM

FIELD OF THE INVENTION

The present invention relates in particular to technology for improving data retrieval efficiency in a distributed file system.

DESCRIPTION OF THE RELATED ART

In recent years, industries such as the manufacturing industry have introduced a variety of systems such as business systems, production planning systems, production administration systems, and physical distribution systems with the aim of improving the efficiency of the various areas of business. In each system, the most recent data required for performing the various tasks are stored as files in a database. The users of each system then conduct retrieval of the database from dedicated terminals belonging to each particular system in order to refer to the desired data.

However, often the various systems have been introduced independently, and the equipment configuration and operating methods vary between systems. As a result, problems arise in those cases where data is retrieved from files distributed over a plurality of systems, as a number of data retrieval must be conducted over a plurality of systems before the desired data can be found, meaning the retrieval operation can take considerable time.

SUMMARY OF THE INVENTION

The present invention takes into consideration the above problems, with an object of integrating existing file systems and providing an integrated retrieval system with improved data retrieval efficiency by introducing so-called agents into a distributed file system.

Furthermore, another object of the present invention is to distribute a medium recorded with the integrated retrieval program of the present invention, so that people who acquire the medium can easily establish an integrated retrieval system.

To achieve the aforementioned objects, as a first device for solving the problems, there is provided an integrated retrieval system in a distributed file system which comprises a plurality of data management devices for distributively storing and managing data files, a plurality of cyclic control devices provided in a one-to-one ratio with the data management devices, and an input/output device for performing the input of retrieval instructions to the data management devices and the output of retrieval results from the data management devices, wherein the cyclic control devices comprise; a retrieval completion judgment device for judging whether or not a retrieval has been completed based on the retrieval instruction and retrieval results, a determination device for determining the next data management device to be retrieved when the retrieval completion judgment device has judged that the current retrieval has not been completed, and a retrieval instruction transmission device for transmitting the retrieval instruction to the data management device determined by the determination device.

With such a construction, when a retrieval of a distributed file system is conducted, a retrieval instruction is input via the input/output device. When a retrieval instruction is input, the data retrieval is executed in a data management device. A cyclic control device then judges whether or not the retrieval is completed based on the retrieval instruction and the retrieval results. Then, if the retrieval is still incomplete, the next data management device to be retrieved is determined and the retrieval instruction is transmitted to this next data management device. Following this, the retrieval instruction is transferred between the cyclic control devices and the data management devices until either the retrieval is completed, or all the data management devices have been retrieved. That is, by conducting only one retrieval operation, the retrieval instruction is automatically transferred between the cyclic control devices and the data management devices until the retrieval for the desired data is completed. Consequently, the data retrieval efficiency in the distributed file systems can be improved.

Furthermore, the construction may have a cyclic management device which manages collectively the plurality of cyclic control devices, wherein the cyclic management device is equipped with a definition file registration device for registering a definition file which defines the next data management device to be retrieved in accordance with the retrieval results, and the determination device determines the next data management device to be retrieved based on a definition file duplicated from the definition file registration device and the retrieval results.

With such a construction, the next data management device to be retrieved is determined based on a definition file duplicated from the definition file registration device and the retrieval results. That is, definition files are managed centrally in the definition file registration device, and duplicated from here to the cyclic control devices. Consequently, in those cases where it is necessary to update a definition file due to an alteration of, or an enlargement or reduction in the scale of the retrieval object, only the definition files registered in the definition file registration device need to be updated. As a result, maintenance work is reduced, enabling a reduction in running costs.

Moreover, the construction may be such that a protocol conversion device is disposed between the data management device and the cyclic control device, for converting the protocol between the data management device and the cyclic control device.

With such a construction, protocol conversion between the data management device and the cyclic control device is carried out by the protocol conversion device. Consequently, when establishing the integrated retrieval system of the present invention by utilizing an existing data management device, it is only necessary to customize the protocol conversion device to match it with the existing data management device. As a result, the integrated retrieval system can be established quickly and at low cost.

As a second device for solving the problems, there is provided an integrated retrieval method in a distributed file system which comprises a plurality of data management processes for distributively storing and managing data files, a plurality of cyclic control processes provided in a one-to-one ratio with the data management processes, and an input/output process for performing the input of retrieval instructions to the data management processes and the output of retrieval results from the data management processes, wherein the cyclic control processes comprise a retrieval completion judgment process for judging whether or not a retrieval has been completed based on the retrieval instruction and retrieval results, a determination process for determining the next data management process to be retrieved when the retrieval completion judgment process has judged that the current retrieval has been completed, and a retrieval instruction transmission process for transmitting the retrieval instruction to the data management process determined by the determination process.

With such a construction, when a retrieval of a distributed file system is conducted, a retrieval instruction is input via the input/output process. When a retrieval instruction is input, the data retrieval is executed in a data management process. A cyclic control process then judges whether or not the retrieval is completed based on the retrieval instruction and the retrieval results. Then, if the retrieval is still incomplete, the next data management process to be retrieved is determined and the retrieval instruction is transmitted to this next data management process. Following this, the retrieval instruction is transferred between the cyclic control processes and the data management processes until either the retrieval is completed, or all the data management processes have been retrieved. That is, by conducting only one retrieval operation, the retrieval instruction is automatically transferred between the cyclic control processes and the data management processes until the retrieval for the desired data is completed. Consequently, the data retrieval efficiency in the distributed file system can be improved.

Furthermore, the construction may have a cyclic management process which manages collectively the plurality of cyclic control processes, wherein the cyclic management process is equipped with a definition file registration process for registering a definition file which defines the next data management process to be retrieved in accordance with the retrieval results, and the determination process determines the next data management process to be retrieved based on a definition file duplicated from the definition file registration process and the retrieval results.

With such a construction, the next data management process to be retrieved is determined based on a definition file duplicated from the definition file registration process and the retrieval results. That is, definition files are managed centrally in the definition file registration process, and duplicated from here to the cyclic control processes. Consequently, in those cases where it is necessary to update a definition file due to an alteration of, or an enlargement or reduction in the scale of the retrieval object, only the definition files registered in the definition file registration process need to be updated. As a result, maintenance work is reduced, enabling a reduction in running costs.

As a third device for solving the problems, there is provided a medium recorded with an integrated retrieval program in a distributed file system, in which the integrated retrieval program realizes a plurality of data management functions for distributively storing and managing data files, a plurality of cyclic control functions provided in a one-to-one ratio with the data management functions, and an input/output function for performing the input of retrieval instructions to the data management functions and the output of retrieval results from the data management functions, wherein the cyclic control functions comprise a program for realizing a retrieval completion judgment function for judging whether or not a retrieval has been completed based on the retrieval instruction and retrieval results, a determination function for determining the next data management function to be retrieved when the retrieval completion judgment function has judged that the current retrieval has not been completed, and a retrieval instruction transmission function for transmitting the retrieval instruction to the data management function determined by the determination function.

In this respect, the term "medium" means any medium which allows reliable storage of various information and which also allows the reliable retrieval of information as it is needed; specifically media such as paper cards (punch cards), paper tapes, magnetic tapes, magnetic disks, magnetic drums, IC cards and CDROMs.

With such a construction, an integrated retrieval program for realizing the data management function, the cyclic control function and the input/output function is recorded on a medium. The cyclic control function comprises a program for realizing a retrieval completion judgment function, a determination function, and a retrieval instruction transmission function. Consequently, from a medium recorded with the programs for realizing the various functions, each of the various functions can be transferred to a typical electronic computer for example, enabling the easy establishment of an integrated retrieval system of the present invention.

Furthermore, the construction may have a cyclic management function which manages collectively the plurality of cyclic control functions, wherein the cyclic management function is equipped with a definition file registration function for registering a definition file which defines the next data management function to be retrieved in accordance with the retrieval results, and the determination function determines the next data management function to be retrieved based on a definition file duplicated from the definition file registration function and the retrieval results.

With such a construction, the next data management function to be retrieved is determined based on a definition file duplicated from the definition file registration function and the retrieval results. That is, definition files are managed centrally in the definition file registration function, and duplicated from here to the cyclic control functions. Consequently, in those cases where it is necessary to update a definition file due to an alteration of, or an enlargement or reduction in the scale of the retrieval object, only the definition files registered in the definition file registration function need to be updated. As a result, maintenance work is reduced, enabling a reduction in running costs.

As a fourth device for solving the problems, there is provided an integrated retrieval system in a distributed file system comprising a plurality of retrieval execution devices for receiving data retrieval instructions and executing data retrieval, a retrieval completion judgment device for judging, based on the results of the data retrieval, whether or not the data retrieval specified by the data retrieval instruction has been completed, and a retrieval instruction transmission device for transmitting the data retrieval instruction to another retrieval execution device when judged that the data retrieval specified by the data retrieval instruction is still incomplete.

With such a construction, when a data retrieval instruction is received, a data retrieval is executed by a retrieval execution device. Then, based on the results of the data retrieval, a judgment is made by the retrieval completion judgment device as to whether or not the data retrieval specified by the data retrieval instruction has been completed. If the judgment is made that the data retrieval specified by the data retrieval instruction is incomplete, the data retrieval instruction is transmitted to another retrieval execution device by the retrieval instruction transmission device. Subsequently, the data retrieval instruction is continuously transmitted to the other retrieval execution device until the data retrieval specified by the data retrieval instruction has been completed. Consequently, it is possible to improve the data retrieval efficiency of the distributed file system.

Furthermore, the construction may be such that in the case where the protocol of the other retrieval execution device differs from the protocol of the retrieval execution device, the other retrieval execution device is provided with a protocol conversion device for converting the data retrieval instruction transmitted by the retrieval instruction transmission device to the protocol of the other retrieval execution device.

With such a construction, even if the protocol of the other retrieval execution device differs from the protocol of the retrieval execution device that transmitted the data retrieval instruction, the transmitted data retrieval instruction is converted by the protocol conversion device to the protocol of the other retrieval execution device. Consequently, even in those cases where an existing distributed file system with different protocols is being used, the integrated retrieval system can be established quickly and at low cost.

As a fifth device for solving the problems, there is provided a medium recorded with an integrated retrieval program in a distributed file system, in which the integrated retrieval program realizes a plurality of retrieval execution functions for receiving data retrieval instructions and executing data retrieval, a retrieval completion judgment function for judging, based on the results of the data retrieval, whether or not the data retrieval specified by the data retrieval instruction has been completed, and a retrieval instruction transmission function for transmitting the data retrieval instruction to another retrieval execution function when judged that the data retrieval specified by the data retrieval instruction is still incomplete.

With such a construction, the integrated retrieval program for realizing the plurality of retrieval execution functions, the retrieval completion judgment function and the retrieval instruction transmission function is recorded on a medium. Consequently, from this medium each of the functions can be transferred to a typical electronic computer, enabling the easy establishment of an integrated retrieval system of the present invention.

Other objects and aspects of the present invention will become apparent from the following description of the embodiment given in conjunction with the appended drawings.

PREFERRED EMBODIMENT

As follows is a detailed description of the present invention with reference to the appended drawings.

Figure 1:
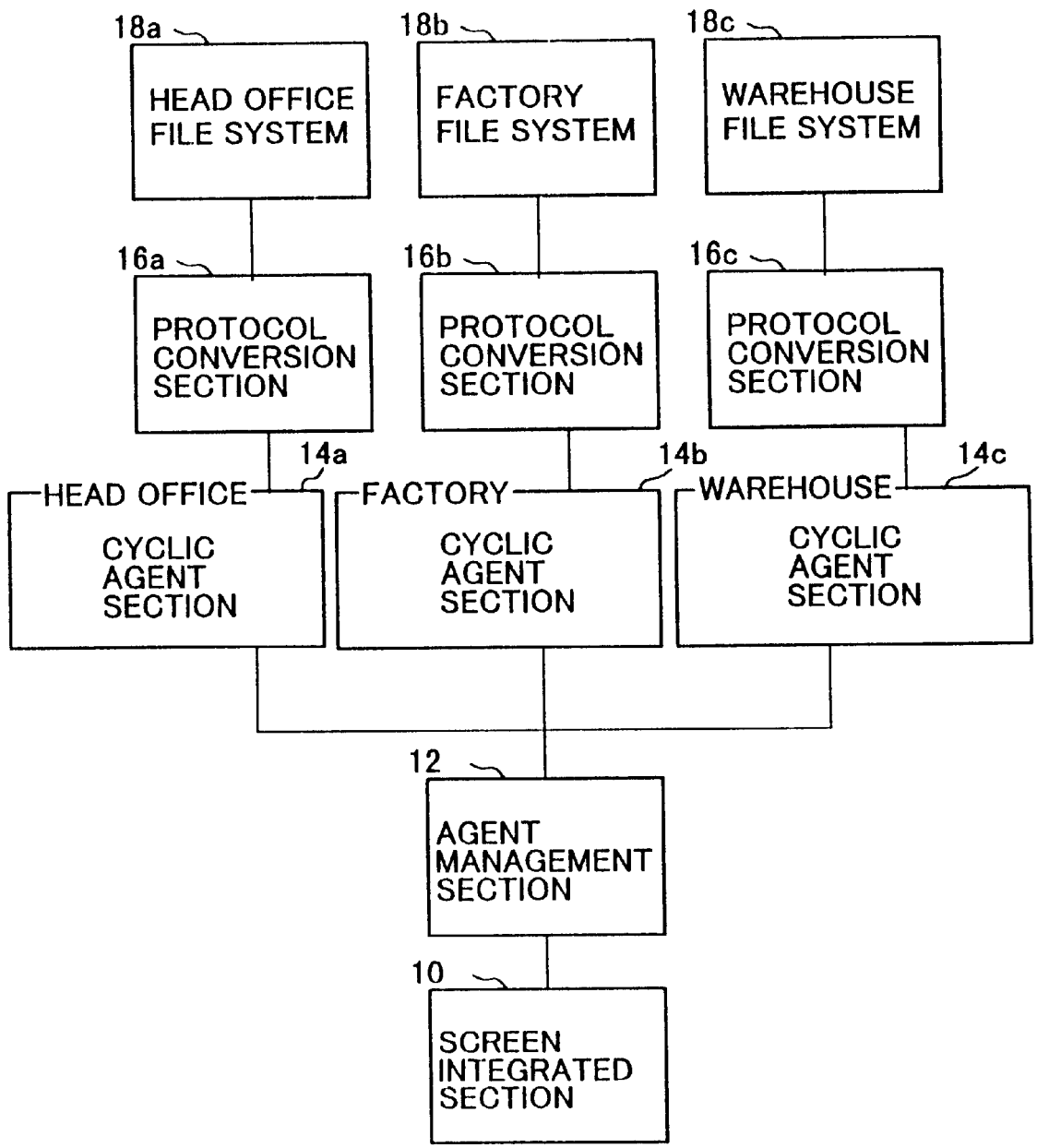
FIG. 1 is a system diagram showing an embodiment of an integrated retrieval system of the present invention.

FIG. 1 shows a system configuration of an embodiment of an integrated retrieval system of the present invention which utilizes an existing distributed file system. In the description below, it will be assumed for the sake of simplicity, that the distributed file system comprises three file systems located in geographically separate locations; specifically a head office file system, a factory file system, and a warehouse file system.

The integrated retrieval system comprises of a screen integrated section 10, an agent management section 12, a cyclic agent section 14 (14a~14c), a protocol conversion section 16 (16a~16c), and a distributed file system 18 (a head office file system 18a, a factory file system 18b, and a warehouse file system 18c). The screen integrated section 10, the agent management section 12, the cyclic agent section 14, the protocol conversion section 16 and the distributed file system 18 are each electronic computers equipped with at least a CPU and memory, and which execute programs stored in memory. Furthermore the computers are network connected via communication lines as shown in FIG. 1. Moreover, the head office file system 18a, the factory file system 18b, and the warehouse file system 18c each operate as a data management device, a data management process, a data management function, a retrieval execution device and a retrieval execution function.

The screen integrated section 10 operates as an input/output device, an input/output process, and an input/output function and is a terminal, where a user of the distributed file system 18 inputs retrieval instructions and receives an output of retrieval results, constituted by, for example, a client. That is, when a user inputs a retrieval object or a retrieval condition (hereafter referred to as a retrieval instruction) at the screen integrated section 10, the retrieval results from the distributed file system 18 are displayed (output).

The agent management section 12 operates as a cyclic management device, a cyclic management process, and a cyclic management function, and determines the first file system to be retrieved based on the retrieval instruction input at the screen integrated section 10. The retrieval instruction is then sent to the cyclic agent section 14 connected to the file system determined. For example in those cases where the head office file system 18a is determined, the retrieval instruction is sent to the head office cyclic agent section 14a.

Figure 2:
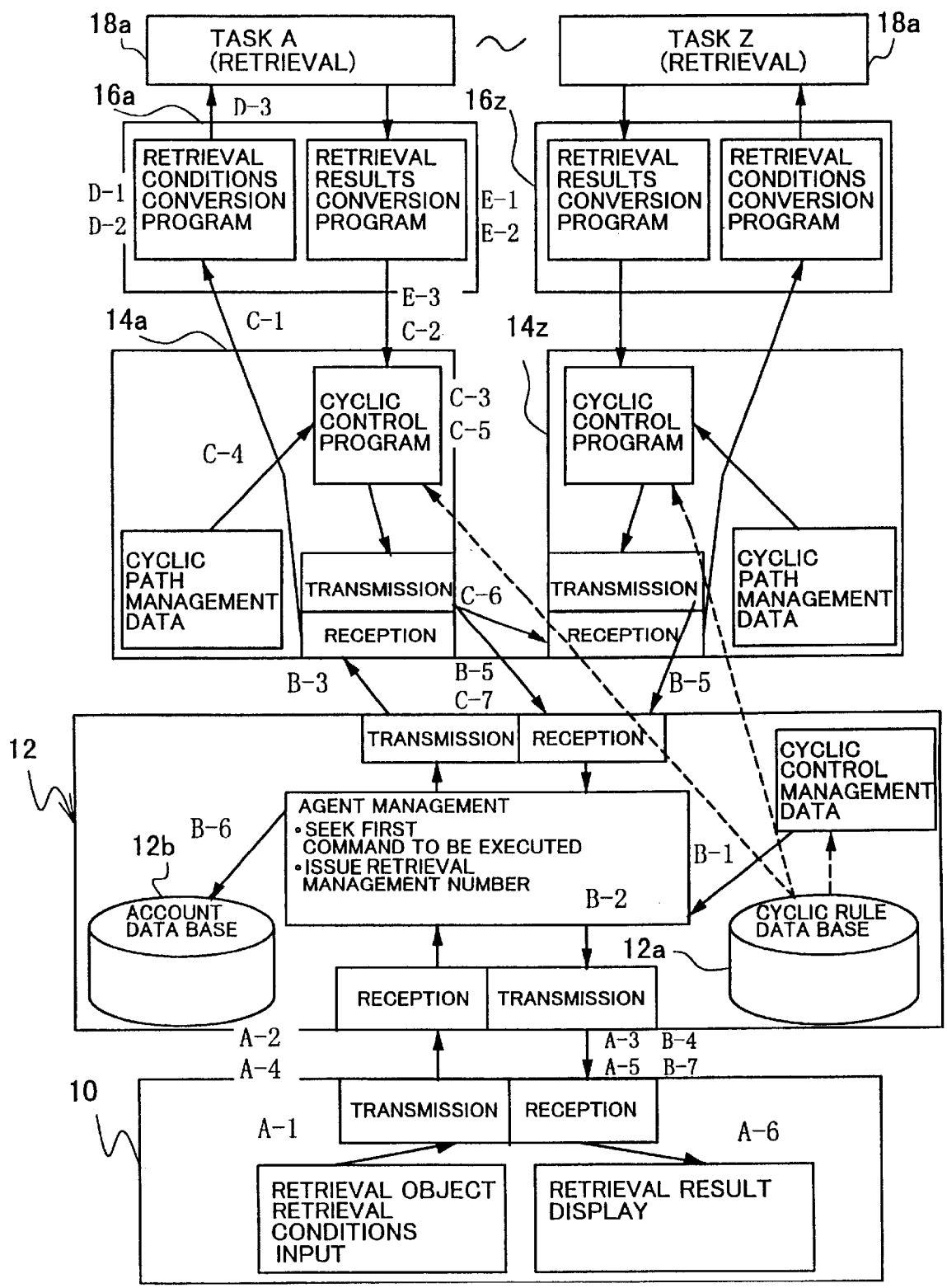
FIG. 2 is a diagram showing details of the embodiment as well as the flow of processing.

Furthermore, as shown in FIG. 2, the agent management section 12 is equipped with a cyclic rule database 12a which operates as a definition file registration device, a definition file registration process, and a definition file registration function, and an account database 12b. The cyclic rule database 12a contains at least an execution command definition file, a command definition file, and a cyclic control program, stored therein. The first command (com1) executed on the retrieval object (retrievals) is defined in the execution command definition file, for example "retrieval1 com1". The file system (head office, warehouse) to be retrieved and the cyclic control program (uclass1.class, uclass2.class) to be used by the command (com1, com2) are defined in the command definition file, for example "com1 head office uclass1.class" or "com2 warehouse uclass2.class". The cyclic control program is transferred to the cyclic agent section 14 described below by remote loading, and then executed.

Consequently, at the agent management section 12, for example, the retrieval object "retrieval1" which has been input is compared and collated with the execution command definition file, and the first command "com1" to be executed is determined. Then, based on the first command to be executed "com1", the first file system "head office file system" to be retrieved is determined by referring to the command definition file.

The cyclic agent section 14 operates as a cyclic control device, a cyclic control process, and a cyclic control function, and judges whether or not there is another file system to be next retrieved based on the retrieval results received via the protocol conversion section 16. Then, when there is another file system to be next retrieved, the retrieval instruction and the retrieval results are sent to the individual cyclic agent section 14 connected to the file system which has been determined as the next to be retrieved.

The judgment as to whether or not there is another file system to be next retrieved is made by the cyclic control program, and the execution command definition file and the command definition file (hereafter jointly referred to as the "cyclic path management data"). For example, in the case where a retrieval is conducted for the number of lots of products for which orders have been received at head office but for which production has still not been completed (retrievals), it is sufficient to refer to the cyclic path management data and then execute the cyclic control program "uclass1.class". The cyclic control program "uclass1.class" may be as described below.

"uclass1.class" . . . retrieval the database of the head office file system 18a, and if the number of incomplete lots is zero send a "zero" incomplete lots message to the agent management section 12 indicating completion of production. On the other hand, if the number of incomplete lots is "positive number", call up "com2" making the number of incomplete lots as an additional parameter.

By using this approach, if the retrieval can not be completed at the head office file system 18a, the command "com2" is called up, and the retrieval for the number of incomplete lots is continued at the warehouse file system 18c.

Such a cyclic control program is transferred from the cyclic rule database 12a of the agent management section 12 by remote loading when the cyclic agent section 14 is activated. It is determined which cyclic control program is to be remote loaded to which cyclic agent section 14 by referring to the command definition file. That is, it the command definition file is "com1 head office uclass1.class", then the cyclic control program "uclass1.class" will be executed at the head office cyclic agent section 14a. Consequently, the cyclic control program "uclass1.class" need only be remote loaded to the head office cyclic agent section 14a.

In this way, by having a configuration where the cyclic control program is remote loaded, the cyclic control program can be managed centrally. Consequently, if a problem is discovered with a particular cyclic control program, only the cyclic control program stored in the cyclic rule database 12a need be modified.

The protocol conversion section 16 operates as a protocol conversion device, and as shown in FIG. 2, comprises the retrieval conditions conversion program and the retrieval results conversion program relating to each of the file systems. The protocol conversion section 16 carries out protocol conversions between the distributed file system 18 and the cyclic agent section 14. Specifically, the retrieval conditions conversion program carries out conversions from the protocol of the cyclic agent section 14 to that of the distributed file system 18. On the other hand the retrieval results conversion program carries out conversions from the protocol of the distributed file system 18 to that of the cyclic agent section 14. Consequently, by providing a protocol conversion section 16, even if the protocols of existing distributed file systems 18 differ from one another, an integrated retrieval system of the present invention can be easily configured. Naturally, in those cases where the protocols of the distributed file system 18 and the cyclic agent section 14 are the same, the protocol conversion section 16 can be omitted.

Next is a description of the operation of an integrated retrieval system of the present invention of the above configuration with reference to the processing flow diagram shown in FIG. 2 and the flow charts shown in FIGS. 3~8. In the processing flow diagram shown in FIG. 2, the assumption is made that the distributed file system 18 comprising a plurality of file systems 18a~18z is used.

Figure 3:
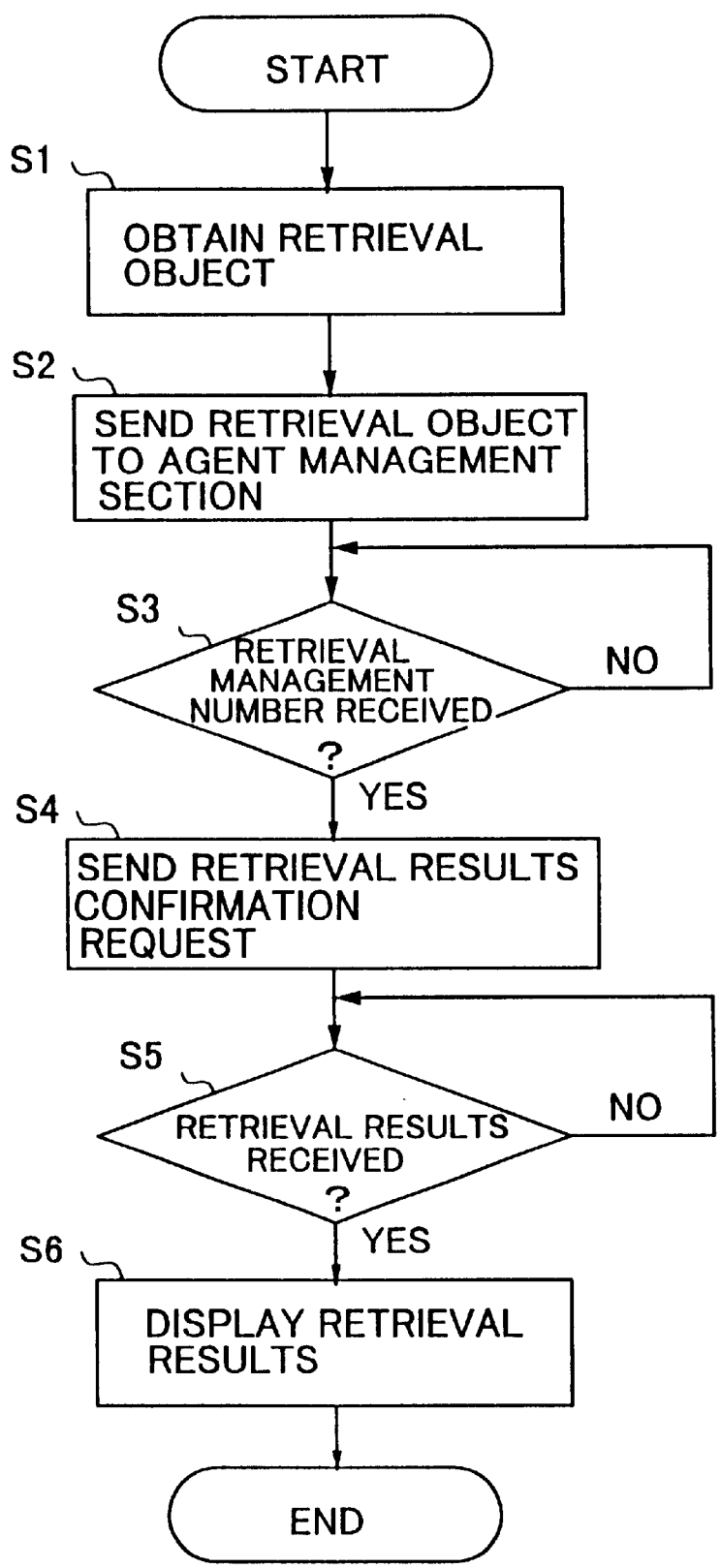
FIG. 3 is a flow chart showing the processing at a screen integrated section of the embodiment.

FIG. 3 is a flow chart showing the processing content executed at the screen integrated section 10. The routine shown would be executed, for example, when a retrieval object or a retrieval condition was input.

In step 1 (abbreviated to S1 in the figures, with other steps similarly abbreviated), a retrieval object and retrieval conditions input at the screen integrated section 10 are obtained (process A-1). The retrieval object specifies what is to be retrieved, for example "the number of lots of products for which orders have been received but for which production has still not been completed" described in the example above. Furthermore, examples of retrieval conditions are items such as order numbers which specify the product to be retrieved.

In step 2, the retrieval object and the retrieval conditions are sent to the agent management section 12 (process A-2).

In step 3, a judgment is made as to whether or not a retrieval management number has been received from the agent management section 12, with process pausing at this point until the retrieval management number is received (process A-3). This retrieval management number specifies the retrieval process within the integrated retrieval system.

In step 4, a retrieval management number is assigned and a retrieval results confirmation request sent to the agent management section 12 (process A-4). Here, the reason for assigning a retrieval management number is that usually a plurality of screen integrated sections 10 are connected to an integrated retrieval system, and so it is necessary to link each retrieval request with a particular screen integrated section 10. That is, by assigning a retrieval management number, it is possible to distinguish which retrieval request was made from which screen integrated section 10.

In step 5, a judgment is made as to whether or not any retrieval results have been received from the agent management section 12, with process pausing at this point until the retrieval results are received (process A-5).

In step 6 the retrieval results received are displayed on the screen integrated section 10 (process A-6).

The processing described above in steps 1~6 comprises the processing for the input of retrieval objects and retrieval conditions for generating a retrieval request, and the processing for displaying retrieval results generated by a retrieval request.

Figure 4:
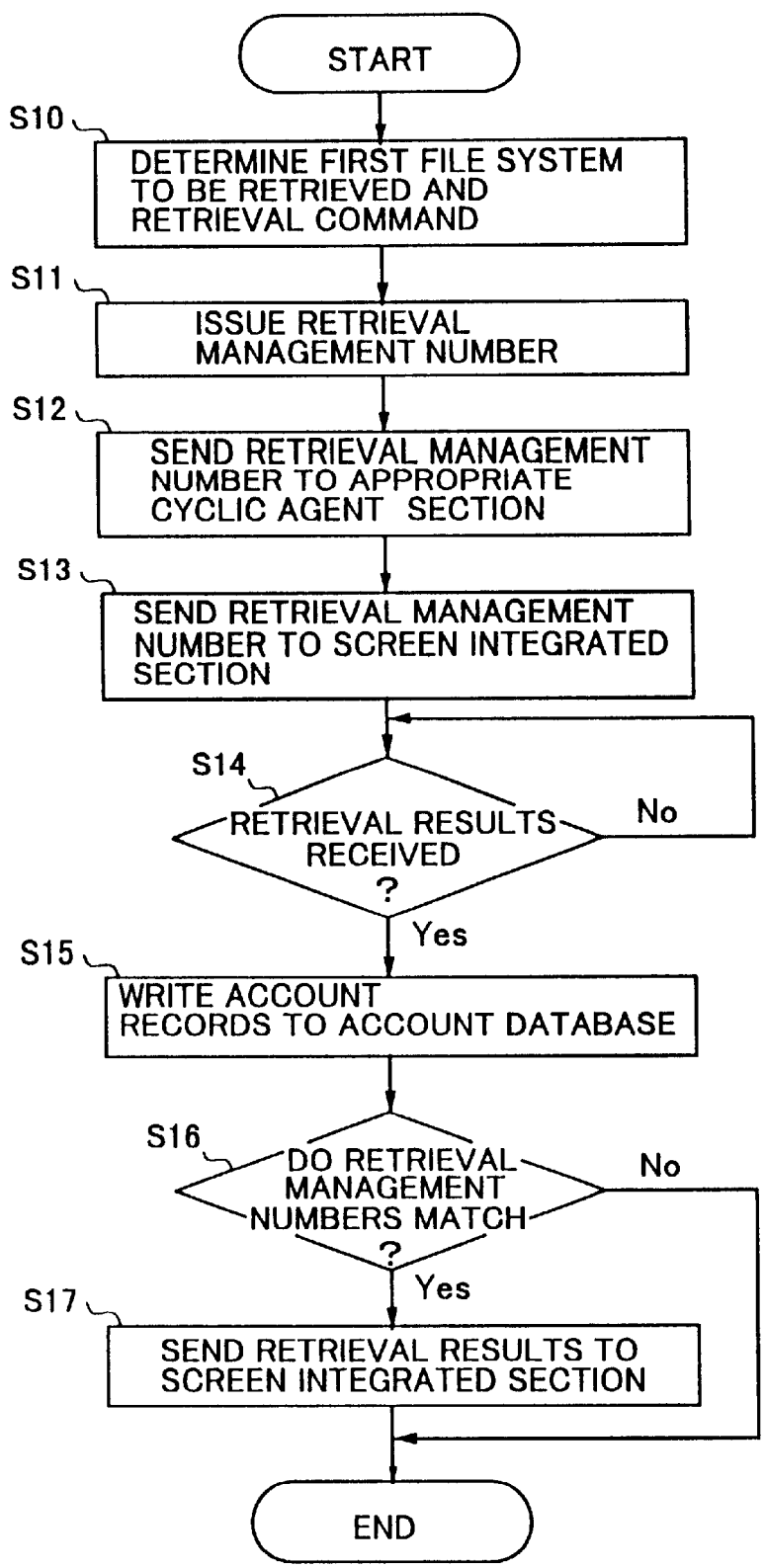
FIG. 4 is a flow chart showing the processing at an agent management section of the embodiment.

FIG. 4 is a flow chart showing the processing content executed at the agent management section 12. This routine is executed, for example, when a retrieval object and retrieval conditions are received from the screen integrated section 10, and realizes a cyclic management device, a cyclic management process, and a cyclic management function.

In step 10, based on the retrieval object received from the screen integrated section 10, reference is made to the cyclic path management data stored in the cyclic rule database 12a, and a determination then made as to the first file system to be retrieved and the retrieval command (process B-1). Specifically, in the example outlined above where the retrieval object is "retrieval1", the execution command definition file is "retrieval1 com1", and the command definition file is "com1 head office uclass1.class", at first, reference is made to the execution command definition file based on the retrieval object, and then the retrieval command "com1" is determined. Next, based on the determined retrieval command "com1", reference is made to the command definition file, and the first file system to be retrieved "head office file system" to be retrieved is determined. In the description below, it will be assumed for the sake of simplicity, that the first file system to be retrieved is the file system 18a which carries out task A.

In step 11, a retrieval management number is issued for the retrieval request received from the screen integrated section 10 (process B-2). The retrieval management number issued is unique across the entire integrated retrieval system.

In step 12, the retrieval management number, the retrieval command name, and the retrieval conditions are sent to the individual cyclic agent section 14a connected to the first file system 18a to be retrieved (process B-3).

In step 13, the retrieval management number is sent to the screen integrated section 10 (process B-4).

In step 14, a judgment is made as to whether or not the retrieval management number and the retrieval results have been received via the cyclic agent section 14a, with process pausing at this point until the retrieval management number and results are received (process B-5). The retrieval results can include an error message indicating that the retrieval failed to be completed normally.

In step 15, an account record is created for each user of the integrated retrieval system. The account records thus created are then written to the account database 12b (process B-6).

In step 16, the retrieval management number relating to the retrieval results confirmation request received from the screen integrated section 10, and the retrieval management number received via the cyclic agent section 14a are compared. Then, a judgment is made as to whether they are identical with each other or not, and if they are identical with each other, control proceeds to step 17 (Yes), whereas if they are not identical with each other, the routine finishes (No). That is, the processing at step 16 makes the judgment as to which retrieval request from which screen integrated section 10 the received retrieval results correspond.

In step 17, the retrieval results are sent to the screen integrated section 10 (process B-7).

The processing described above in steps 10–17 comprises the determination of the first file system to be retrieved, the writing of the account records, and the determination of the transmission address of the retrieval results, all carried out at the agent management section 12.

Figure 5:
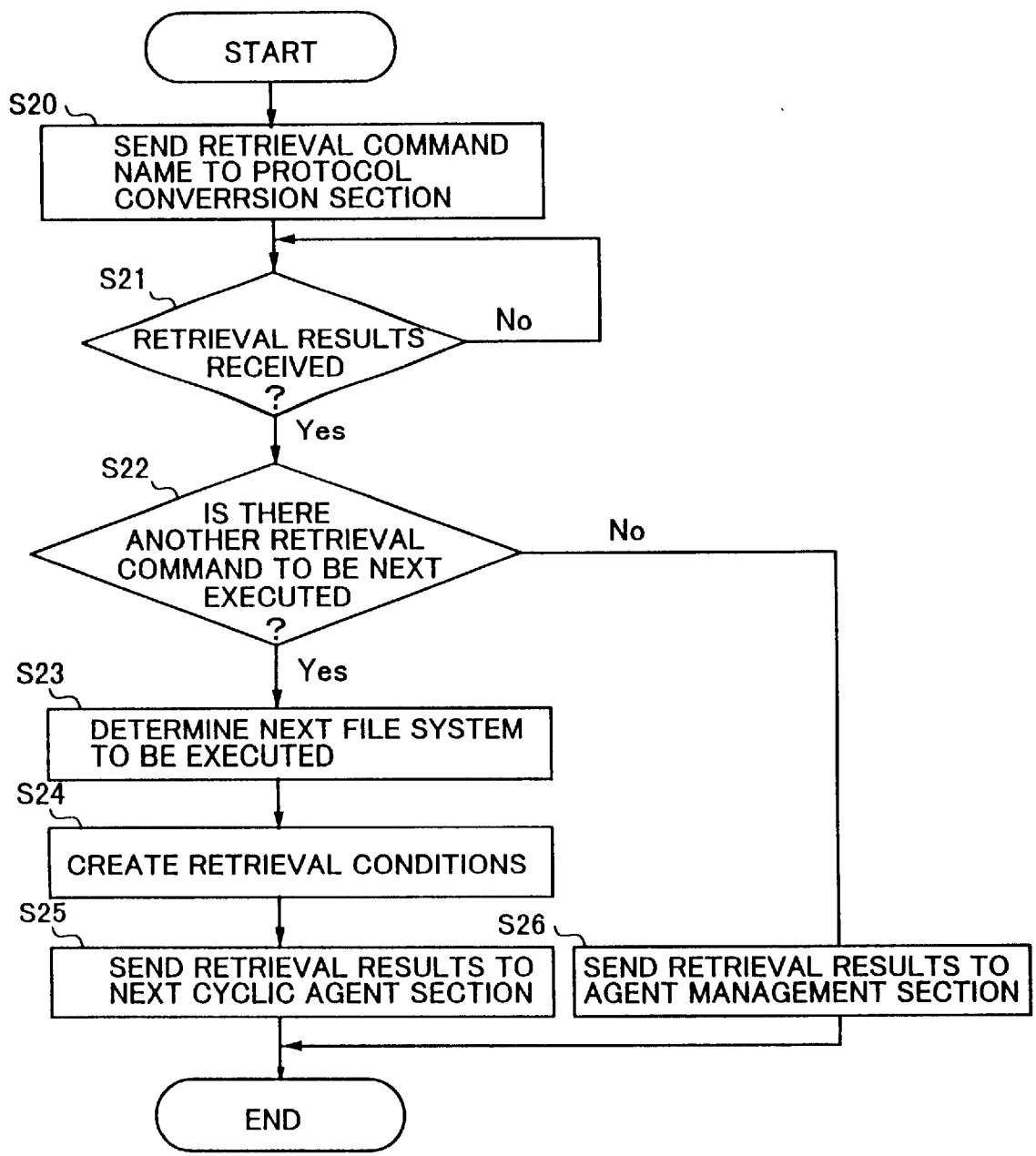
FIG. 5 is a flow chart showing the processing at a cyclic agent section of the embodiment.

FIG. 5 is a flow chart showing the processing content executed at the cyclic agent section 14a. This routine is executed, for example, when a retrieval management number, a retrieval command name and retrieval conditions are received from the agent management section 12, and realizes a cyclic control device, a cyclic control process, and a cyclic control function.

In step 20, the retrieval command name and retrieval conditions received from the agent management section 12 are sent to the protocol conversion section 16a (process C-1).

In step 21, a judgment is made as to whether or not any retrieval results have been received via the protocol conversion section 16a, with process pausing at this point until the retrieval results are received (process C-2).

In step 22, a judgment is made, based on the retrieval results received, as to whether or not there are any further retrieval commands to be next executed (process C-3). This judgment is a function of the cyclic control program corresponding to the retrieval object, as shown in the example above. Then, if there is another retrieval command to be next executed, the routine proceeds to step 23 (Yes), while if there are no further retrieval commands to be next executed, that is if the retrieval has been completed, the routine proceeds to step 26 (No). Thus, the processing at step 22 corresponds to a retrieval completion judgment device, a retrieval completion judgment process, and a retrieval completion judgment function.

In step 23, the next file system to be retrieved is determined. That is, based on the next retrieval command name to be executed, reference is made to the command definition file in the cyclic path management data, and the next file system to be retrieved is determined (process C-4). In the previous example, in those cases where the retrieval can not be completed at the head office file system 18a, the retrieval command "com2" is called up, and so if the command definition file is "com2 warehouse uclass2.class", then the next file system to be retrieved is identified as the warehouse file system 18c. Thus, the processing at step 23 corresponds to a determination device, a determination process and a determination function.

In step 24, retrieval conditions and additional parameters are created (process C-5). Here, the reason for creating the retrieval conditions is that the desired data may be distributed over a plurality of file systems. Specifically, in the integrated retrieval system shown in FIG. 1, if the number of products in stock is to be retrieved, then the retrieval results from the factory file system 18b should be sent to the warehouse file system 18c, and the number of products found in each of the file systems 18b, 18c should be added together.

In step 25, the created retrieval conditions and additional parameters are sent to the cyclic agent section 14 connected to the next file system to be retrieved (process C-6). Thus, the processing at step 25 corresponds to a retrieval instruction transmission device, a retrieval instruction transmission process, and a retrieval instruction transmission function. Furthermore, in this embodiment, for ease of description, it is assumed that the retrieval conditions are sent from the cyclic agent section 14a to the cyclic agent section 14z.

In step 26, processing is carried out for those cases where the retrieval is completed at the file system 18a. Specifically, the retrieval results from the file system 18a are sent to the agent management section 12 (process C-7).

The processing described above in steps 20–26 comprises the judgment by the cyclic agent section 14a as to whether or not, based on the retrieval results, there is another file system to be next retrieved. Then, in those cases where there is another file system to be next retrieved, the retrieval conditions are sent to the next file system 14z without going via the agent management section 12. On the other hand, in those cases where there are no further file systems to be next retrieved, the retrieval results are sent to the agent management section 12. Consequently, the loading of the agent management section 12 can be lightened and the responsiveness thereof improved, and the volume of communication travelling through the communication lines can be reduced.

Figure 6:
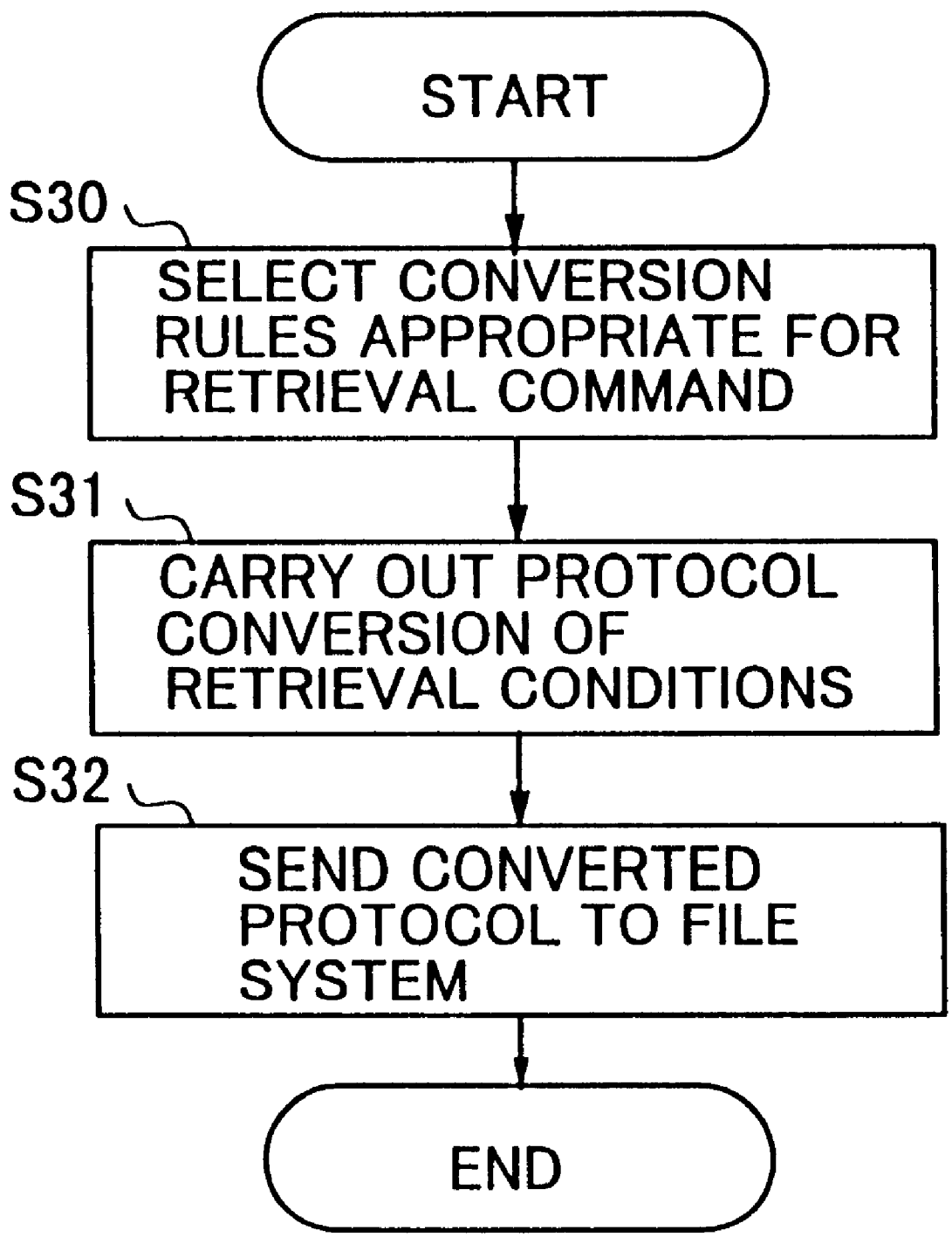
FIG. 6 is a flow chart showing a retrieval conditions conversion program of the embodiment.
Figure 7:
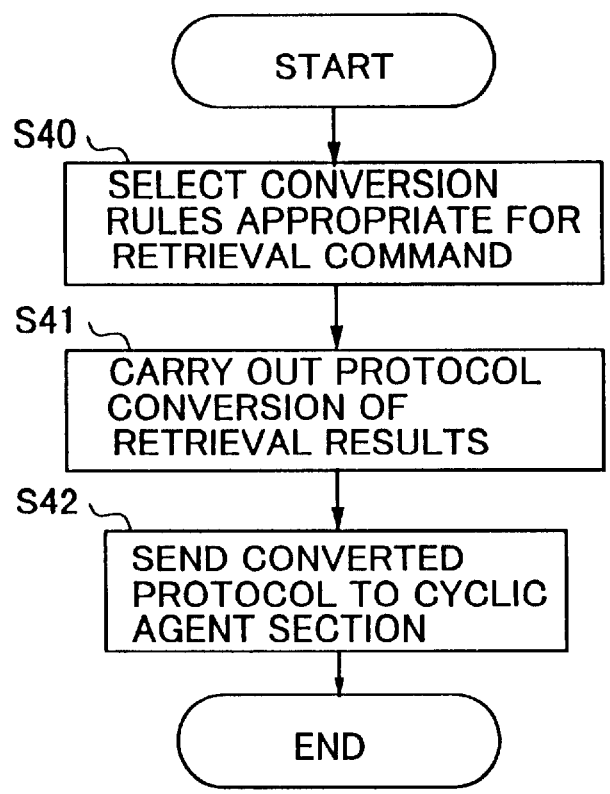
FIG. 7 is a flow chart showing a retrieval results conversion program of the embodiment.

FIG. 6 and FIG. 7 are flow charts showing the processing content executed at the protocol conversion section 16a. Specifically, the processing content of the retrieval conditions conversion program is shown in FIG. 6, and the processing content of the retrieval results conversion program is shown in FIG. 7. The retrieval conditions conversion program and the retrieval results conversion program are executed respectively when retrieval conditions or retrieval results are received, and realize a protocol conversion device.

First is a description of the processing content of the retrieval conditions conversion program outlined in FIG. 6.

In step 30, the conversion rules appropriate for the retrieval command are selected based on the retrieval command received from the cyclic agent section 14a (process D-1).

In step 31, the retrieval conditions received from the cyclic agent section 14a are converted to a protocol suitable for the file system 18a. (process D-2).

In step 32, the converted protocol is sent to the file system 18a (process D-3).

Next is a description of the processing content of the retrieval results conversion program outlined in FIG. 7.

In step 40, the conversion rules appropriate for the retrieval command are selected based on the retrieval command received from the cyclic agent section 14a (process E-1).

In step 41, the retrieval results received from the file system 18a are converted to a protocol suitable for the cyclic agent section 14a. (process E-2).

In step 42, the converted protocol is sent to the cyclic agent section 14a (process E-3).

The processing described above in steps 30~32, or steps 40~42 comprises the selection of the conversion rules appropriate for the retrieval command, and then the automatic conversion of protocols between the cyclic agent section 14a and the file system 18a.

Figure 8:
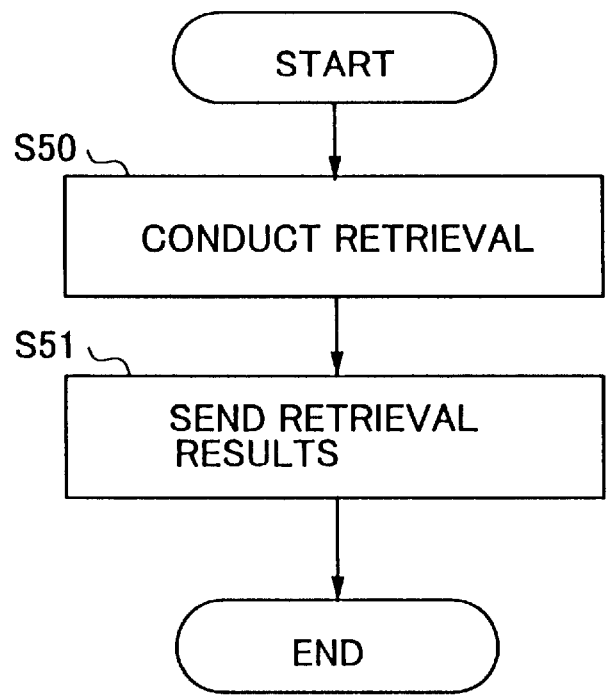
FIG. 8 is a flow chart showing the processing at a file system of the embodiment.

FIG. 8 is a flow chart showing the processing content executed at the file system 18a. This processing is executed when retrieval conditions are received from the protocol conversion section 16a, and realizes a retrieval execution device and a retrieval execution function.

In step 50, a database is retrieved based on the retrieval conditions received.

In step 51, the database retrieval results are sent to the protocol conversion section 16a.

The processing described above and outlined in FIGS. 3~8 allows an integrated retrieval system to be established using a plurality of file systems 18a~18z with different protocols. That is, by simply attaching a screen integrated section 10, an agent management section 12, cyclic agent sections 14a~14z, and protocol conversion sections 16a~16z to an existing series of file systems 18a~18z, an integrated retrieval system can be easily established. Consequently, development costs can be reduced and development time shortened.

Furthermore, when desired data needs to be retrieved across a plurality of file systems 18a~18z, the judgment as to whether or not there is another file system to be next retrieved is made at the cyclic agent sections 14a~14z, connected to the file systems 18a~18z, respectively. Then, in those cases where there is another file system to be next retrieved, the retrieval conditions are sent directly from one cyclic agent section 14 to the other cyclic agent section 14 without going via the agent management section 12. Consequently, the loading of the agent management section 12 can be lightened, and the responsiveness to a retrieval improved. Furthermore, by reducing the volume of communication travelling through the communication lines, a reduction can be made in communication costs.

Moreover, the cyclic control program and the cyclic path management data which make the judgment at the cyclic agent section 14 as to whether or not there is another file system to be next retrieved are remote loaded from the cyclic rule database 12a of the agent management section 12. Consequently, increases in the retrieval objects can be easily dealt with, and the work required to maintain the integrated file system once established is reduced, enabling a reduction in running costs.

Moreover, by recording a program with these types of functions onto a medium such as paper cards (punch cards), paper tapes, magnetic tapes, magnetic disks, magnetic drums, IC cards or CD-ROMs, the integrated retrieval program of the present invention can be easily distributed. Any person then obtaining the program on such media could easily establish an integrated retrieval system using a typical electronic computer system.

What is claimed is:

1. An integrated retrieval system in a distributed file system comprising:

a plurality of data management means for distributively storing and managing data files at geographically separate locations, a plurality of cyclic control means provided in a one-to-one ratio with the data management means, and input/output means for performing the input of retrieval instructions to said data management means and the output of retrieval results from the data management means, wherein said cyclic control means includes:

retrieval completion judgment means for judging whether or not a retrieval has been completed based on the retrieval instructions from said input/output means and the retrieval results from said data management means, determination means for determining the next data management means to be retrieved when said retrieval completion judgment means has judged that the current retrieval has not been completed, and retrieval instruction transmission means for transmitting said retrieval instruction to the data management means determined by said determination means.

2. An integrated retrieval system in a distributed file system according to claim 1, having cyclic management means which manages collectively said plurality of cyclic control means, wherein said cyclic management means is equipped with definition file registration means for registering a definition file which defines the next data management means to be retrieved in accordance with said retrieval results, and said determination means determines the next data management means to be retrieved based on a definition file duplicated from said definition file registration means and said retrieval results.

3. An integrated retrieval system in a distributed file system according to claim 1, wherein protocol conversion means is disposed between said data management means and said cyclic control means for converting the protocol between said data management means and said cyclic control means.

4. An integrated retrieval method in a distributed file system comprising:

a plurality of data management processes for distributively storing and managing data files at geographically separate locations, a plurality of cyclic control processes provided in a one-to-one ratio with the data management processes, and an input/output process for performing the input of retrieval instructions to said data management processes and the output of retrieval results from the data management processes, wherein said cyclic control processes include:

a retrieval completion judgment process for judging whether or not a retrieval has been completed based on the retrieval instructions from said input/output process and the retrieval results from said data management processes, a determination process for determining the next data management process to be retrieved when said retrieval completion judgment process has judged that the current retrieval has not been completed, and a retrieval instruction transmission process for transmitting said retrieval instruction to the data management process determined by said determination process.

5. An integrated retrieval method in a distributed file system according to claim 4, having a cyclic management process which manages collectively said plurality of cyclic control processes, wherein said cyclic management process is equipped with a definition file registration process for registering a definition file which defines the next data management process to be retrieved in accordance with said retrieval results, and said determination process determines the next data management process to be retrieved based on a definition file duplicated from said definition file registration process and said retrieval results.

6. A medium recorded with an integrated retrieval program in a distributed file system, in which said integrated retrieval program realizes:

a plurality of data management functions for distributively storing and managing data files at geographically separate locations, a plurality of cyclic control functions provided in a one-to-one ratio with the data management functions, and an input/output function for performing the input of retrieval instructions to said data management functions and the output of retrieval results from the data management functions, wherein said cyclic control functions comprise a program for realizing a retrieval completion judgment function for judging whether or not a retrieval has been completed based on the retrieval instructions from said input/output function and the retrieval results from said data management functions, a determination function for determining the next data management function to be retrieved when said retrieval completion judgment function has judged that the current retrieval has not been completed, and a retrieval instruction transmission function for transmitting said retrieval instruction to the data management function determined by said determination function.

7. A medium recorded with an integrated retrieval program in a distributed file system according to claim 6, having a cyclic management function which manages collectively said plurality of cyclic control functions, wherein the cyclic management function is equipped with a definition file registration function for registering a definition file which defines the next data management function to be retrieved in accordance with said retrieval results, and said determination function determines the next data management function to be retrieved based on a definition file duplicated from said definition file registration function and said retrieval results.

8. An integrated retrieval system in a distributed file system comprising:

a plurality of retrieval execution means distributed at geographically separate locations for receiving data retrieval instructions and executing data retrieval, retrieval completion judgment means for judging, based on the results of said data retrieval, whether or not the data retrieval specified by said data retrieval instruction has been completed, and retrieval instruction transmission means for transmitting said data retrieval instruction to another retrieval execution means when judged that the data retrieval specified by said data retrieval instruction is still incomplete.

9. An integrated retrieval system in a distributed file system according to claim 8, wherein in the case where the protocol of said other retrieval execution means differs from the protocol of said retrieval execution means, said other retrieval execution means is provided with protocol conversion means for converting said data retrieval instruction transmitted by said retrieval instruction transmission means to the protocol of the other retrieval execution means.

10. A medium recorded with an integrated retrieval program in a distributed file system, wherein said integral retrieval program realizes:

a plurality of retrieval execution functions distributed at geographically separate locations for receiving data retrieval instructions and executing data retrieval, a retrieval completion judgment function for judging, based on the results of said data retrieval, whether or not the data retrieval specified by said data retrieval instruction has been completed, and a retrieval instruction transmission function for transmitting said data retrieval instruction to another retrieval execution function when judged that the data retrieval specified by said data retrieval instruction is still incomplete.

* * * * *